United States Patent
Guillemot et al.

(10) Patent No.: US 7,583,822 B2
(45) Date of Patent: Sep. 1, 2009

(54) METHOD FOR IDENTIFYING PERSONS AND SYSTEM FOR CARRYING OUT SAID METHOD

(75) Inventors: Florence Guillemot, Triel sur Seine (FR); Bernard Didier, Vulaines sur Seine (FR)

(73) Assignee: Sagem SA, Paris (FR)

( * ) Notice: Subject to any disclaimer, the term of this patent is extended or adjusted under 35 U.S.C. 154(b) by 445 days.

(21) Appl. No.: 10/546,513

(22) PCT Filed: Feb. 19, 2004

(86) PCT No.: PCT/FR2004/000381
§ 371 (c)(1),
(2), (4) Date: May 19, 2006

(87) PCT Pub. No.: WO2004/077200
PCT Pub. Date: Sep. 10, 2004

(65) Prior Publication Data
US 2007/0067639 A1    Mar. 22, 2007

(30) Foreign Application Priority Data
Feb. 20, 2003    (FR)    .................................. 03 02093

(51) Int. Cl.
*G06K 9/00* (2006.01)

(52) U.S. Cl. ...................... 382/115; 382/124; 340/5.82; 713/186

(58) Field of Classification Search ................. 382/115, 382/125, 124, 159, 116, 187, 228, 127; 704/246, 704/273, E17.015, E17.003, 247, 275; 713/186; 340/5.83, 5.82, 5.52; 356/71; 600/506, 300; 435/6; 536/23.1
See application file for complete search history.

(56) References Cited

U.S. PATENT DOCUMENTS

| | | | | |
|---|---|---|---|---|
| 6,115,484 A | * | 9/2000 | Bowker et al. | 382/127 |
| 6,243,492 B1 | * | 6/2001 | Kamei | 382/181 |
| 6,324,297 B1 | * | 11/2001 | Uchida | 382/125 |
| 2004/0057604 A1 | * | 3/2004 | David et al. | 382/115 |

OTHER PUBLICATIONS

Joshi, D.G. et al., "Computer-Vision-Based Approach to Personal Identification using Finger Crease Pattern," Pattern Recognition, vol. 31, No. 1, 1998, pp. 15-22.

Shu, W. et al., "Palmprint Verification: An Implementation of Biometric Technology," Pattern Recognition, 1998, Proceedings, Fourteenth International Conference on Brisbane, QLD., Australia Aug. 16-20, 1998, pp. 219-221.

Chen, J. et al., "The Crease's Discriminating Power in Palmprint Recognition," Object Detection, vol. 4554, pp. 67-72, Proceedings of SPIE-The International Society for Optical Engineering.

Kwon, Young Ho et al., "Age Classification from Facial Images," Proceedings of the Computer Society Conference on Computer Vision and Pattern Recognition, Seattle, Jun. 21-23, 1994, pp. 762-767.

* cited by examiner

*Primary Examiner*—Sheela C Chawan
(74) *Attorney, Agent, or Firm*—Lumen Patent Firm

(57) ABSTRACT

The present invention provides a process and system for identifying a person. According to the inventive method, and with the aid of the system, a sensor is used to capture biometric characteristics of a person to be identified. Identification data is extracted and the identification data of the person to be identified is compared to reference data in a database. In a preferred embodiment, an image is taken of creases in the skin of the person to be identified, reference crease data having been taken beforehand and stored in a database, and a first recognition is effected by means of the skin crease image in a filtering stage. After this first recognition, the reference data of the database may be filtered using other biometric characteristics, with continuing recognition using these other characteristics.

13 Claims, 3 Drawing Sheets

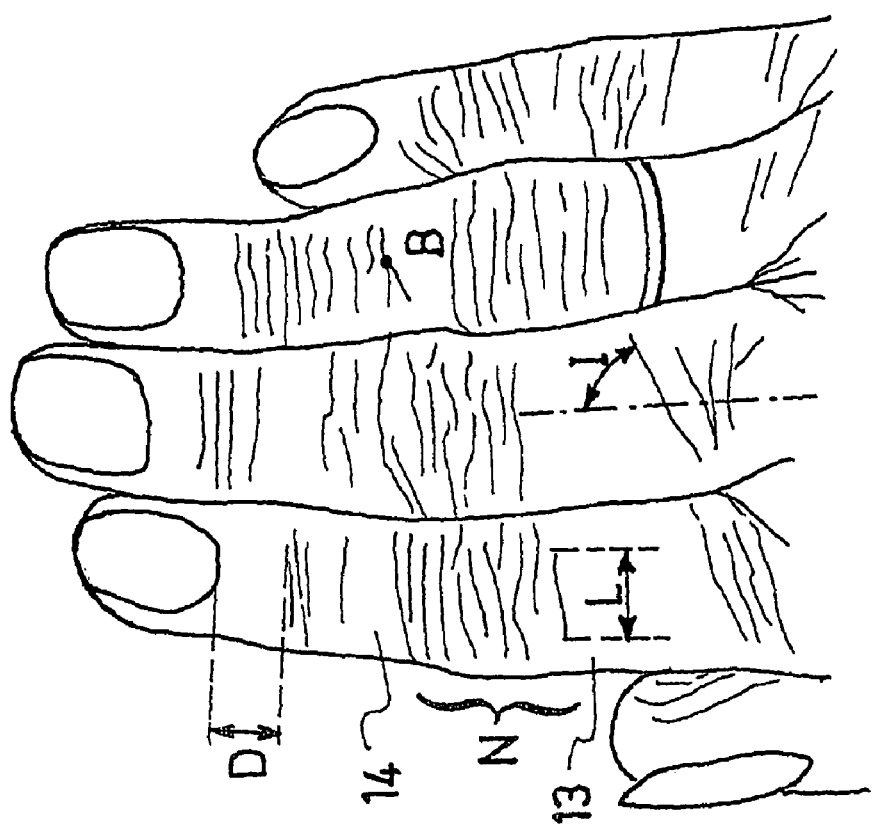
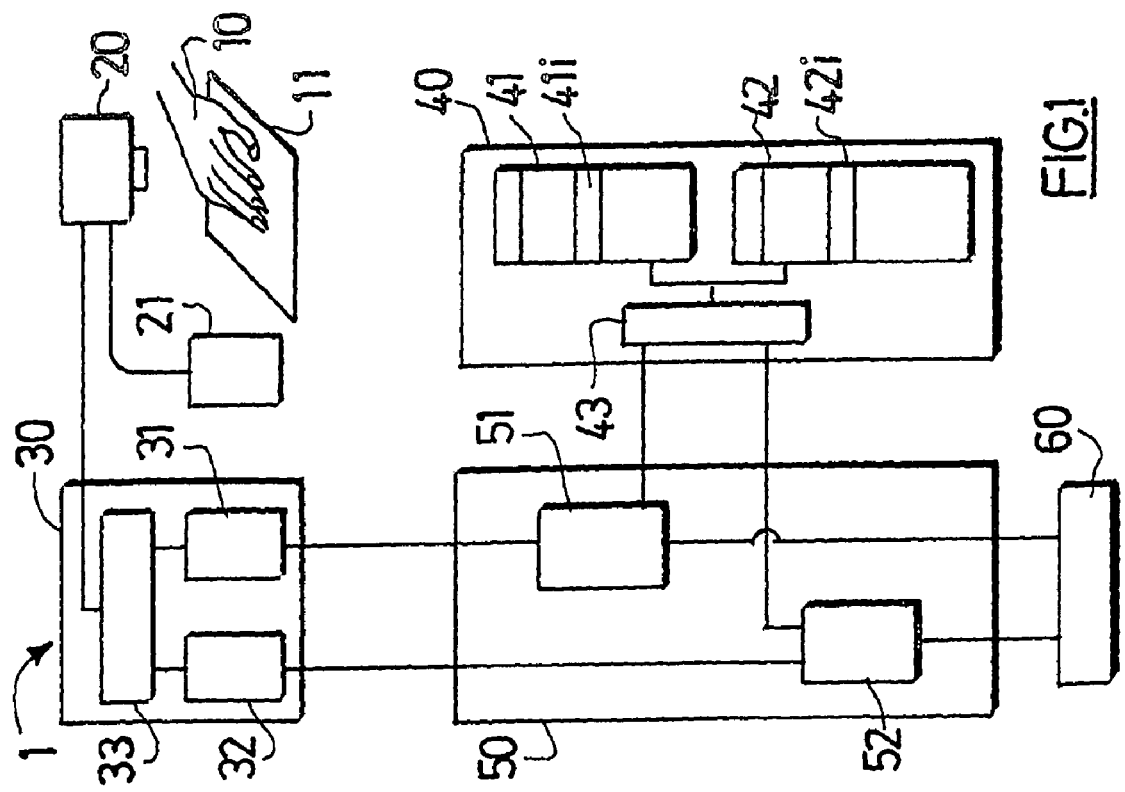

METHOD FOR IDENTIFYING PERSONS AND SYSTEM FOR CARRYING OUT SAID METHOD

FIELD OF THE INVENTION

The present invention relates generally to personal identification. More particularly, the present invention relates to a method and system for identifying persons using biometric characteristics.

BACKGROUND

Methods for the identification, recognition, or authentication of people from their biometric characteristics are common at the present time. In recognition systems, use can be made of fingerprints, the iris of the eye, the ear, and even the total morphology of the head. However, fingerprints are most commonly used for purposes of recognition.

While the use of fingerprints for identification provides a high level of resolution, it has a large number of drawbacks. For example, because of the considerable amount of information that it can deliver, fingerprinting systems are expensive and slow to operate.

The acquisition of fingerprints involves placing the tip of a finger on a printing surface. However:

the grease or perspiration covering the finger can affect the resulting print;

the contact between the finger and the printing surface can lead to distortions; and it is relatively easy to cover the finger with a false fingerprint sheath so that it is invisible to an operator.

In short, the applicant has sought an alternative solution that is more flexible and more rapid than fingerprinting, but is as reliable as fingerprinting for identification purposes.

SUMMARY OF THE INVENTION

The invention concerns a personal identification method that uses biometric characteristics. According to the invention, the biometric characteristics of a person to be identified are acquired, identification data are extracted from these characteristics, and the identification data of the person to be identified are then compared with reference data in a database. In a preferred embodiment, an image is taken of creases in the skin of the person to be identified, reference crease data having been taken beforehand and stored in a database, an image is made of the creases in the skin, and a first recognition is effected by means of the image in a filtering stage. After this first recognition, the reference data of the database may be filtered using other biometric characteristics, with continuing recognition using these other characteristics.

The creases used for personal identification can, for example, include the following:

the creases at the finger joints, preferably on the back of the hand, at the phalangeal joints; and the creases on the forehead.

In addition to the objectives which were the basis of the invention, recognition that uses the creases in the skin also has the advantage of supplying contextual information, meaning that it can present, in alphanumeric form, certain associated characteristics of the people concerned, such as their height, their age, their gender, and other data, which is more reliable than the type of data that may be obtained from conventional biometric data (fingerprints, iris, etc.). For example, if it is observed that the creases of an area of the skin on the hand are quite close to each other, it can be deduced that this is probably a child rather than an adult.

Moreover by virtue of the method of the invention, it is possible to "cut" the zone of the database containing very dense fingerprint identification information, and thus obtain more rapid access to the exact information sought.

By virtue of this recognition method having several stages, the method of the invention distinguishes itself clearly from that which is described by the document of Joshi D G et al: "Computer-vision-based approach to personal identification using finger crease pattern", Pattern Recognition, Perganion Press Inc. Elmsford, N.Y. US, vol. 31, No. 1, 1998, p. 15-22.

It can be seen that in many applications, a more rudimentary recognition that uses only skin creases will be adequate, while still offering all of the considerable advantages provided by the technique of matching entered characteristics with reference data in a database:

by inputting information that is rich and sufficiently stable over time to supply a recognition system;

by inputting additional information that can be used to increase accuracy and speed.

The invention also concerns a personal identification system that has at least one imaging device, a module for the processing of images from the imaging device in order to extract contextual information and biometric characteristics from it, a reference database containing reference contextual information and reference biometric characteristics, and a matching module containing a component for comparison of the contextual information extracted and the reference contextual information and a component for matching of the biometric characteristics extracted and the reference biometric characteristics, where the component for comparison of the contextual information supplies filtering information for the reference biometric characteristics to be matched.

Preferably, the image processing module includes a component for the calculation of contextual information relating to the associated characteristics of the people concerned, and where, as contextual information, one will choose the number of creases per joint and per finger, the distance between the crease zones of the different joints, the length of these creases in a predetermined order;

the number of creases on the forehead, with their separation and their length.

If the contextual information suffices to identify the subject, then the biometric characteristics are not used, since the matching module is short-circuited.

Also preferably, provision is made for a surface on which to place the hand of the people to be identified, the position of which is determined in relation to the focal plane of the imaging device, and a complementary biometric imaging device, such as a fingerprint imaging device, incorporated into the surface, the reference fingerprint biometric characteristics having been entered into the database beforehand. This version is particularly useful in criminal identification applications.

Also preferably, the matching module can be associated with a memory card by means of a card reader fitted to the system. The memory card is then used as a reference database for an authentication system.

Also preferably, the matching module is associated with a microphone fitted to the system. The reference database then includes reference voice data, and the system is very suitable as a residential doorkeeper.

It can again be seen that the acquisition of crease data is less aggressive to the subject to be checked than that of the fingerprints or the iris for example, which can be a considerable asset, especially in strictly civil applications.

In addition, the process of identification based on skin creases is harder to falsify, since the detection of a false hand can be discovered more easily than a false print or a lens for the iris.

BRIEF DESCRIPTION OF THE FIGURES

The present invention together with its objectives and advantages will be understood by reading the following description in conjunction with the drawings, in which:

FIG. 1 represents a functional block diagram of the identification system according to the invention;

FIG. 2 is an image of the skin on the back of a hand;

DETAILED DESCRIPTION OF THE INVENTION

Figure 4:
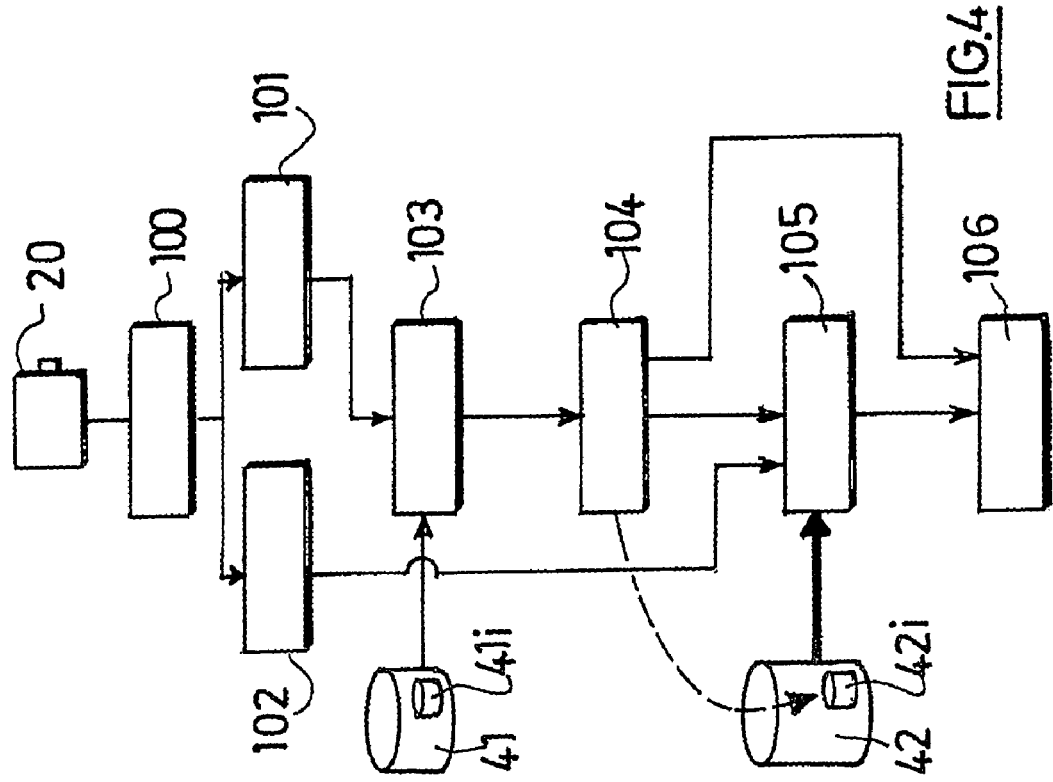
FIG. 4 is a functional flow chart that implements the process of the invention.

Referring to FIG. 1, the system 1 includes an imaging device 20, here a digital video camera supplying images, controlled by a presence detector 21. The presence detector 21, which can be an optical device composed of an electroluminescent diode LED and a photodiode or a pressure imaging device, detects the presence of a hand 10 of a person to be identified on a surface 11, on which the hand is placed to allow correct focussing.

The camera 20 is connected to a module for the processing of images 30, which extracts the identification data from the images of the imaging device 20, and which is associated with a module 50 for matching of the identification data from different sources, one of the sources being the imaging device 20 and another being a reference database 40. The matching module 50 is also associated with the database 40 and controls a module 60 for displaying the results of the identification, where the latter can be capable of controlling actions as a consequence.

More particularly, the image processing module 30 includes a component 33 for conversion of the images into identification data, and a component 32 for the extraction of biometric characteristics from the identification data, the function of which is also implemented when identification data is from fingerprints. The characteristics are then compiled into a summary description of the fingerprint images (arches, loops, whorls, etc.).

In this example, an image is taken of the skin on the back of the hand 10. Referring to FIG. 2, the skin of the fingers appears to be lined with creases, in particular at the finger joints, and especially between the proximal phalange 13 and the middle phalange 14.

The identification data produced by the conversion component 33 are also transmitted to a component 31 for the calculation of contextual information from these identification data.

The contextual information can, for example, be the number N of creases on each joint, the distance D separating the creases from the base of the nail, the transverse length L of the creases, and possibly their angle I with respect to the longitudinal axis of the finger, or the number of bifurcations B on the finger.

This information is of the alphanumeric type, and some of it is closely linked to the associated characteristics of the people concerned, such as height, age, gender, etc. This information is of a type such that having one combination of these characteristics can exclude the possibility of having another combinations of these characteristics. Thus, the biometric characteristics corresponding to a particular combination can be filtered.

The database 40 is managed via an interface 43 connected to the matching module 50, and includes a memory 41 for reference contextual information and a memory 42 for reference biometric characteristics. The memories 41 and 42 are further divided into smaller memory zones 41$i$ and 42$i$, which correspond to one another, with each zone of index i containing either a combination of contextual information 41$i$ or a combination of reference biometric characteristics 42$i$, both of which are associated with a predetermined combination of the associated characteristics mentioned previously and designated by the i index. It is thus possible to select the biometric characteristics of an area 42$i$ of the database by recognition of the contextual information of a zone 41$i$ of the database by virtue of the i index, which can thus serve as a filter.

The matching module 50 includes a matching component (the matcher) 52, which is known to professionals in this field, capable of searching in the database 42 for the reference biometric characteristics that are closest to those extracted from the image taken from the person to be identified, of calculating the probability with which they come from the same person, and of deducing from this the result to be displayed.

The matching module 50 also includes a comparison component 51, which receives the contextual information calculated by the calculation component 31.

Components 51 and 52 are connected to the database 40 by means of the interface 43 and, at the output, to the display module 60.

Figure 3:
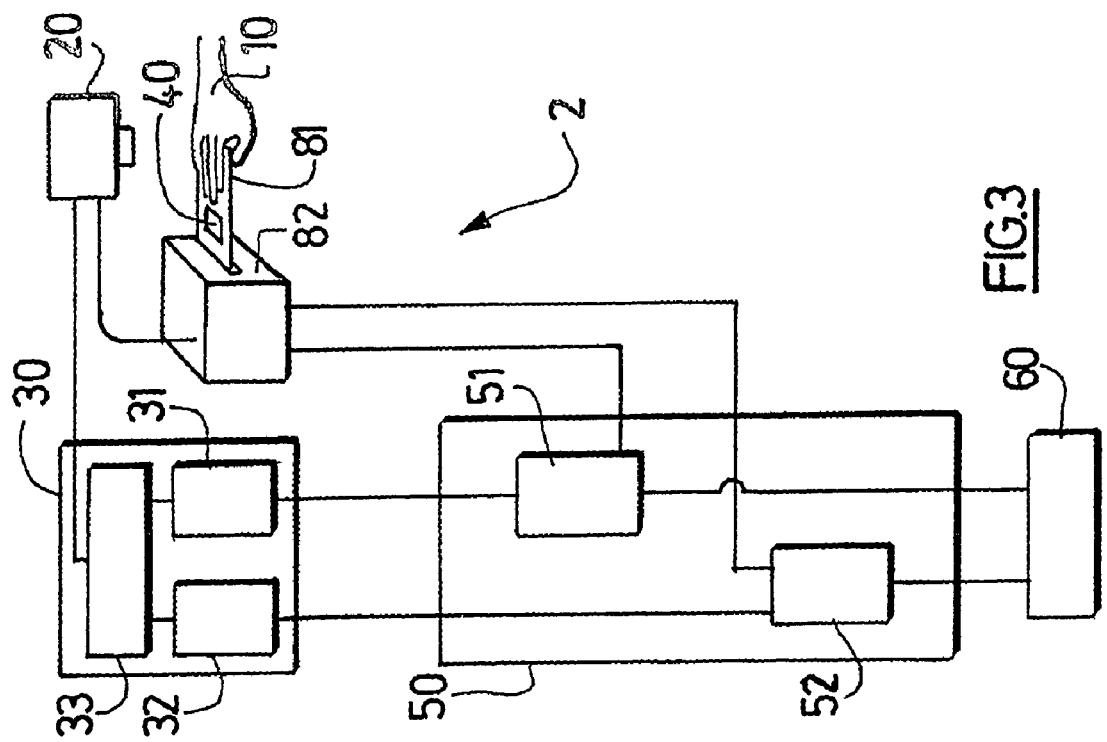
FIG. 3 represents a functional block diagram of an authentication system that implements the process of the invention.

If it is desired to create a personal authentication system, and not merely one for identification, then referring to FIG. 3, system 2 includes all the elements of system 1 except that the database 40 is replaced by a memory card, or a chip, 81 connected to the system by means of a card reader 82 containing the interface 43. The reader 82 also includes a card presence detector, which replaces detector 21.

In a simple version, the memory card contains a single zone 41$i$ containing the contextual information of the card holder, the matching module contains only the comparison block 51, and the processing module 30 does not need to contain the extraction block 32.

For more complex applications requiring the inclusion of a combination of biometric imaging devices, as will be seen later, the two zones 41$i$ and 42$i$ and the two blocks 32 and 52, must be present.

The devices used to acquire images of the skin under good conditions will now be described.

Figure 5:
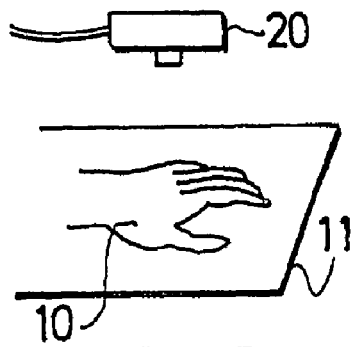
FIG. 5 illustrates the implementation of the system of the invention.

In a simple version, referring to FIG. 5, the system 1 includes a surface 11 on which to rest the hand 10, the imaging device 20 being placed at the back of this surface 11 for correct focussing on the back of the hand.

Figure 6:
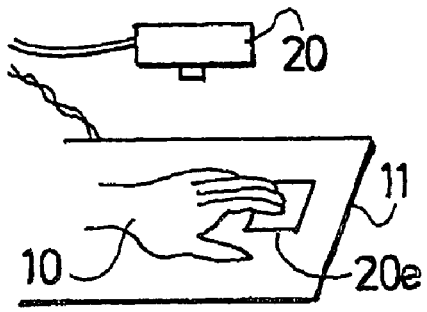
FIG. 6 is a variant of the implementation in FIG. 5, with a fingerprint imaging device.

A more complex version, shown in FIG. 6, requires the inclusion of an additional fingerprint imaging device 20$e$ incorporated into the surface 11, and includes a pressure detector, such that pressing the fingerprint imaging device operates the camera, and the latter then acquires the image when the hand is correctly positioned.

Figure 7:
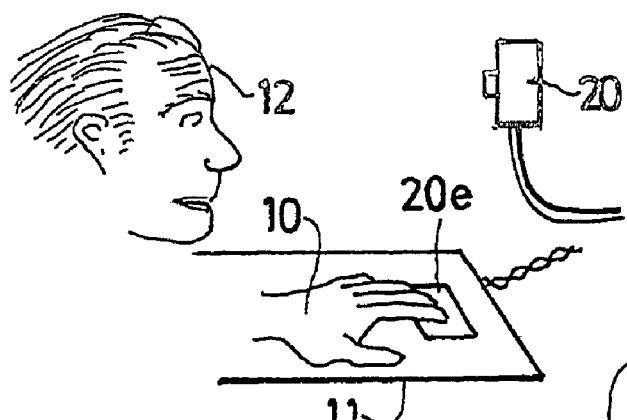
FIG. 7 is another implementation variant of the system for registering the creases on the forehead.

In this latter version, the fingerprint identification data are attached to the skin identification data, both for the data entered and for the reference data. In place of the creases in the skin of the hand, it is also possible, referring to FIG. 7, to acquire images of the creases on the forehead 12, using a system in which the same references designate the same elements.

Figure 8:
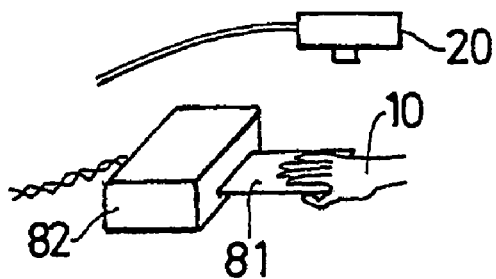
FIG. 8 is an example of realisation of the system of the invention for an authentication application.
Figure 9:
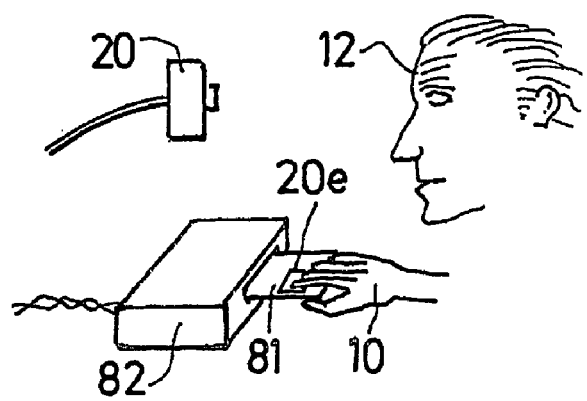
FIG. 9 is a variant of the implementation of the system in FIG. 3, for the acquisition of creases on the forehead.

In a simple version, referring to FIG. 8, the system 2 includes a reader 82 to receive and read the card 81 presented by the hand 10. The imaging device 20 is positioned at the back of the card introduced into the reader, and can thus acquire an image of the back of the hand under good conditions. However, it is also possible, referring to FIG. 9, to acquire an image of the creases on the forehead.

For these last two versions, an additional fingerprint imaging device 20e can be placed on the card itself, such that the authentication system 2 has the same structure as the identification system.

Figure 10:
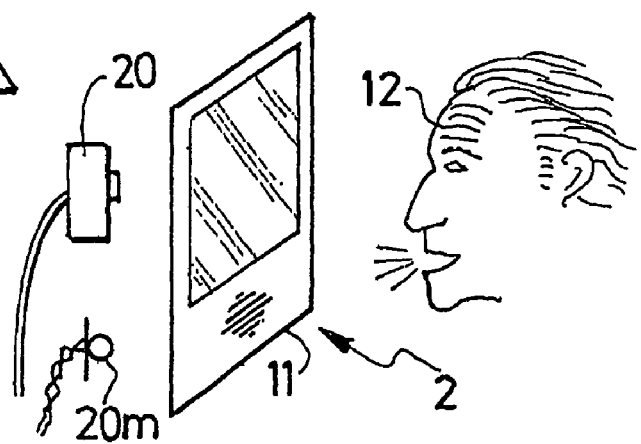
FIG. 10 is a variant of the implementation of the system in FIG. 9.

Referring to FIG. 10, the system 2 can further find its application in devices of the residential doorkeeper type, where the additional imaging device here takes the form of a microphone 20m which can be incorporated into a screen 11, transparent in this case, protecting the camera 20, so that by speaking one's name into the microphone, a person triggers acquisition of the image by the camera, with the forehead being suitably positioned. The voice data are attached to the forehead skin identification data, both for the data entered and the reference data. These voice data can, for example, be of the type supplied by frequency analysis of the speech of the subject.

The operation of the system will now be explained.

Referring to FIG. 4, when the camera 20 is triggered by the detector 21, it acquires an image of the creases in the skin of the hand 10 or on the forehead 12 of the person to be identified. During stage 100, the image is transmitted to the conversion component 33, which converts the image into the identification data of the person to be identified. Next, during stage 102, from these identification data, the extraction component 32 extracts the biometric characteristics of the image and, in parallel, from these same data, during stage 101, the calculation component 31 calculates the contextual information of the image.

The biometric characteristics extracted from the image could then, possibly in stage 105 executed by the matching component 52, be directly compared to the reference biometric characteristics in the memory 42 of the database 40. The results would then be displayed in stage 106 by the display module 60.

However, the matching component must then sweep through all of the memory 42, in order to compare the extracted biometric characteristics with all of the stored reference characteristics in the database.

In this case, however, we avoid this drawback by virtue of the possession of contextual information, and of the preliminary stages of comparison 103 and initialisation 104 of the interface 43.

During stage 103, the comparison component 51 compares the contextual information supplied by the calculation component 31 with all of the reference contextual information in the memory 41, and retains only the closest combinations. These combinations are stored in zones 41i of the memory 41. The i indices constitute information for filtering of the reference biometric characteristics, and are stored in a memory of the interface 43 which is not shown. Since they concern low-volume alphanumeric data, these operations are rapid.

During stage 104, use is made of the results from stage 103:

If no i index or all of the i indices are proposed, this means that filtering has failed, and in accordance with an option described previously, either we pass to stage 105, already described, to continue to the full search, or we pass to stage 106, executed by the display module 60, in order to reject the identification.

If the i index is unique, it designates a unique zone 42i and, if this zone contains only the reference biometric characteristics of a single person, then the subject is identified, and the indicating stage 106 supplies the authentication directly, the matching component 52 being short-circuited.

If one or more i indices are retained, designating one or more zones 42i, and at the same time the reference biometric characteristics contained in them, then the other zones of the database 40 are rejected by the interface 43. Stage 104 then hands control of the operations to stage 105.

During the execution of stage 105 following stage 104, the identification is continued using only the retained biometric characteristics, and the result is communicated to the display stage 106.

Contrary to the execution of stage 105 not following stage 104, the matching component 52 sweeps through only some zones 42i of the memory 42, and the saving in time is considerable.

The invention claimed is:

1. A method of identifying a person, comprising:
   (a) imaging creases in the skin of a person to be identified with an imaging device;
   (b) processing images from the imaging device to extract contextual information and biometric characteristics from said images, wherein said processing is accomplished with a processor;
   (c) comparing the extracted contextual information with reference contextual information contained in a reference database; and
   (d) matching said extracted biometric characteristics with reference biometric characteristics contained in said reference database;
   wherein said compared information is used for a filter to constrain which of said reference biometric characteristics are used to match said extracted biometric characteristics, and
   wherein said creases are selected from the group consisting of creases of finger joints and creases on the forehead.

2. The method according to claim 1, wherein said creases in the skin provide contextual information that can be presented in alphanumeric form, wherein said contextual information includes the number, the position, the length or the angle of said creases.

3. The method according to claim 1, wherein said creases of said finger joints are on the back of the hand at the phalangeal joints.

4. The method according to claim 1, further displaying results of an identification.

5. A personal identification system, comprising:
   (a) an imaging device;
   (b) a module for processing images from said imaging device in order to extract contextual information and biometric characteristics from said images;
   (c) a reference database containing reference contextual information and reference biometric characteristics; and (d) a matching module, wherein said matching module comprises:
  (i) a comparison component for comparing said extracted contextual information and said reference contextual information; and
  (ii) a matching component for matching said extracted biometric characteristics and said reference biometric characteristics;
wherein said comparison component supplies filtering information to constrain which of said reference biometric characteristics in said database are used to match said extracted biometric characteristics,
wherein said imaging processing module includes a component for the calculation of contextual data relating to associated characteristics of a person to be identified.

6. The system according to claim 5, wherein said contextual data are the number, the position, the length, or the angle of creases in the skin.

7. The system according to claim 5, wherein said matching component is short-circuited if contextual information suffices to identify a subject.

8. The system according to claim 5, wherein a fingerprint imaging device is incorporated into a surface on which a hand is placed.

9. The system according to claim 5, wherein said matching module is associated with a memory card by means of a card reader, and wherein the memory of said card serves as said reference database.

10. The system according to claim 9, wherein said card reader is arranged to trigger said imaging device.

11. The system according to claim 5, further comprising a display module for displaying results of an identification.

12. A personal identification system, comprising:
(a) an imaging device;
(b) a module for processing images from said imaging device in order to extract contextual information and biometric characteristics from said images;
(c) a reference database containing reference contextual information and reference biometric characteristics; and
(d) a matching module, wherein said matching module comprises:
  (i) a comparison component for comparing said extracted contextual information and said reference contextual information; and
  (ii) a matching component for matching said extracted biometric characteristics and said reference biometric characteristics;
wherein said comparison component supplies filtering information to constrain which of said reference biometric characteristics in said database are used to match said extracted biometric characteristics,
wherein said matching module is associated with a microphone.

13. The system according to claim 12, wherein said microphone is arranged to trigger said imaging device.

* * * * *